Nov. 27, 1934.   S. MANDL ET AL   1,982,008
COUPLING
Filed Feb. 23, 1934
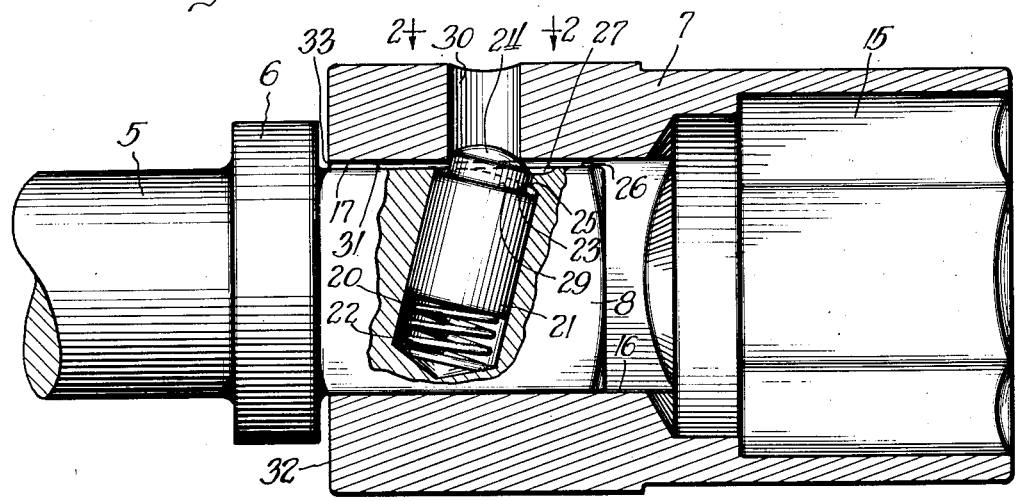
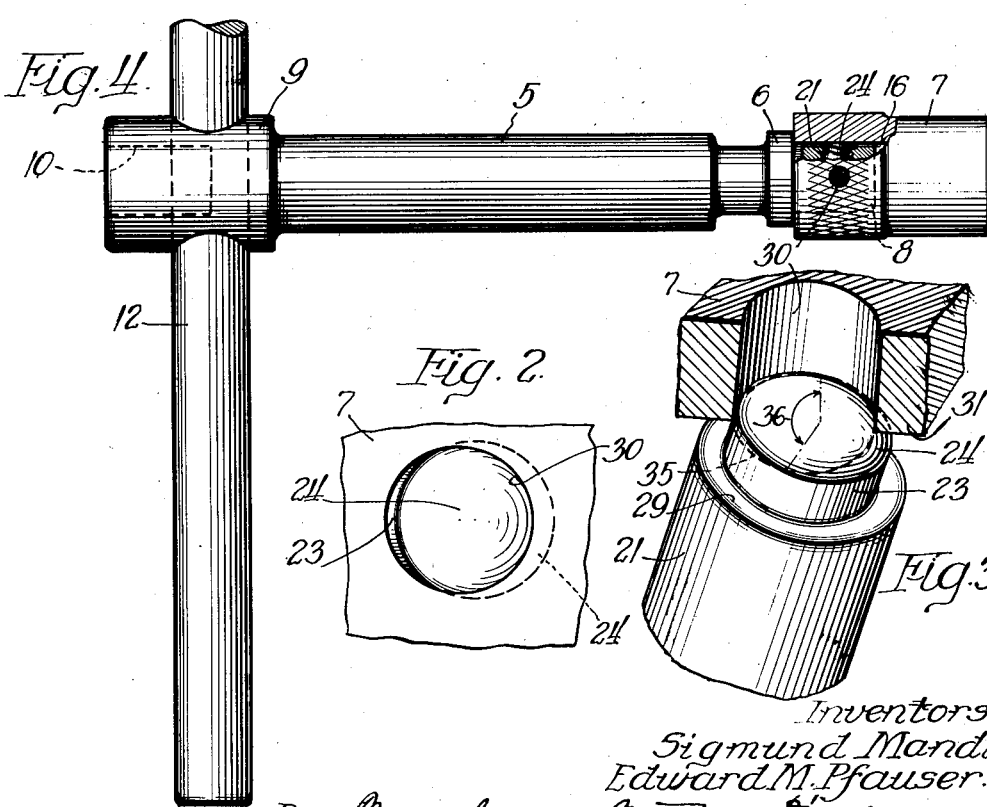
Inventors:
Sigmund Mandl,
Edward M. Pfauser Patented Nov. 27, 1934

1,982,008

UNITED STATES PATENT OFFICE 1,982,008

COUPLING

Sigmund Mandl and Edward M. Pfauser, Milwaukee, Wis., assignors to Blackhawk Mfg. Co., Milwaukee, Wis., a corporation of Wisconsin Application February 23, 1934, Serial No. 712,445

1 Claim. (Cl. 287—119)

This invention relates to couplings, and more particularly to coupling means employed at the shank end of a wrench of the socket type for securing a socket or sleeve thereon.

In its preferred embodiment, the present invention is directed to a coupling of the locking type for securing a socket to the shank end of a wrench, the socket being provided with an opening adapted to receive the rounded head of an inclined plunger which is carried in the shank, the plunger being spring pressed outwardly to wedge itself partially into the opening when the sleeve of the socket is forced into position about the shank. The socket is retained upon the shank by the engagement of the inner defining edge of the opening in the socket with a portion of the shoulder of the plunger. A coupling of this type might also be employed for securing an extension member to the opposite end of the wrench, when it is desired to provide a longer wrench for use in certain situations.

By proper correlation between the diameter of the opening in the socket, and the diameter and radius of curvature of the plunger head, a tight locking fit is obtained, preventing any relative movement or play between the socket and the shank. This is a distinct advantage over the prior art of which I am aware, since it eliminates the loose fit formerly obtained with this type of coupling.

The inclination of the plunger is such that, with the proper correlation of diameters as above pointed out, the cylindrical hole extending radially through the socket sleeve will receive a portion of the spherical surface of the head of the plunger and the defining edge of this hole will engage behind and have contact with the cylindrical portion of the rear side of the plunger to provide a locking engagement which will prevent removal of the socket until the plunger is depressed from such engagement. The plunger, under spring pressure, is normally wedged upwardly at an angle into this cylindrical opening, and thus takes up any looseness in the coupling engagement, providing a positive and rigid lock between the shank and the socket. By the inclination of the plunger head, a smooth rounded camming surface is provided such that upon insertion of the shank into the sleeve portion of the socket, the inner surface of the sleeve opening will ride over this spherical surface and depress the plunger downwardly against its spring, until such time as the plunger is aligned with the cylindrical locking opening.

In conjunction with this construction, chamfering of the edges which define the shank-receiving opening of the socket is eliminated, since by the inclination of the plunger, a smooth camming surface is provided, comprising the rounded head portion which at all times has a portion of its surface lying in the plane of the surface of the shank. Thus, insertion of the shank into the socket will effect depression of the plunger upon its engagement with the edge of the socket, until such time as the locking opening of the socket is disposed in alignment with the plunger head.

The coupling engagement of the present invention may be applied to wrenches in which a friction fit of the socket with the shank, as heretofore, in common use, is employed, whereby either a locking engagement or a friction engagement is provided. It is sometimes desirable, when a wrench of this type is used in connection with a plurality of sockets adapted to fit different sizes of bolts and nuts, that the socket be readily detachable in order to facilitate the application of the wrench to such various uses. For this purpose, a normal frictional fit, of such character as to hold the socket securely in position during rotation of the wrench, is all that is desired. However, in certain uses of the wrench, the same socket is employed for a large number of wrench operations, and it is desirable that it be positively secured to the shank end of the wrench in order that it may be moved readily with the wrench, and any tendency of the socket to stick upon the bolt head or nut when the wrench is withdrawn will be eliminated by this locking engagement.

Other objects and advantages of the present invention will appear more fully from the following detailed description, which, taken in connection with the accompanying drawing, will disclose to those skilled in the art the particular construction and operation of a preferred form of the invention.

In the drawing:

Figure 1 is a sectional elevational view of the coupling disclosed in the present invention, with a portion of the shank of the wrench broken away to show the plunger construction;

Figure 2 is a plan view taken substantially on the line 2—2 of Figure 1, looking in the direction indicated by the arrows;

Figure 3 is a perspective view enlarged to show the particular locking engagement of the plunger head within the opening formed in the socket sleeve; and Figure 4 is an elevational view, partly in section, of a wrench of the type disclosed in the present invention, with the socket only frictionally engaged upon the shank end of the wrench.

Referring now in detail to the drawing, the wrench is indicated generally by the reference 5, and is preferably formed of a high grade steel. The wrench is provided, adjacent its shank end, with a collar 6, which collar serves as an abutment for a socket member 7 which is secured to the shank 8 of the wrench.

As shown in Figure 4, at the opposite end of the wrench an enlarged boss portion 9 is provided, having an opening 10 extending axially thereinto, and having a second opening, preferably of circular form, adapted to receive a rod or bar member 12 extending therethrough, the rod 12 being employed as a lever for rotating the wrench. The opening 10 is adapted to receive a shank of a second wrench member 5 (not shown), when an extension in the length of the wrench is desired, and is preferably polygonal in shape, such as in the form of a square socket, in order to impart rotation effectively from the auxiliary extension to the wrench member 5. This may also be employed to receive the stud end of certain types of sockets.

Considering now the socket member 7 in detail, this member is formed of a high grade steel, such as vanadium steel, and is provided, adjacent its outer end, with a recessed opening indicated at 15, preferably having a polygonally shaped recess to provide a socket for receiving the heads of bolts, nuts or the like. The inner periphery 15 of the socket member 7 is of a dimension to fit a standard size of bolt head, and different sockets 7 having different sized socket openings, are adapted to be coupled to the wrench 5, as is well known in the art. The inner portion of the socket 7 is provided with a recessed opening indicated at 16, which is preferably square in cross section, although it may be of any other polygonal form, and which is adapted to receive the shank end 8 of the wrench 5, the shank 8 being of a cross sectional shape corresponding to the shape of the recess 16.

It will be noted that there is a slight amount of play between the shank 8 and the recess 16, which play is necessary in order to provide for fitting of the various sockets 7 to the shank 8. This play is indicated by the space 17 shown between the upper surface 26 of the shank 8 and the inner surface of the recess 16.

As shown in detail in Figure 1, the shank 8 is provided with an inclined recess indicated at 20, which recess is adapted to receive a plunger member 21, the plunger member being reciprocable in the recess, and being normally urged outwardly thereof by means of the spring 22, which is biased at one end against the bottom surface of the plunger 21, and at its other end seats against the base of the recess 20.

In the preferred embodiment of the invention, the recess 20 is shown as being cylindrical in cross section, as is the plunger 21. This is the preferred form of the invention, since with this form, any rotation of the plunger 21 within the recess will not affect the character or operation of the coupling engagement. Further such a shape will facilitate the drilling of the recess 20.

It will be noted that the plunger 21 is provided with an end portion of reduced diameter, the lateral surface thereof being indicated at 23, and is provided with a spherically shaped head portion 24, which head portion has a radius of curvature greater than the radius of the portion 23 of the plunger. The plunger is held within the recess 20 by means of an undercut ribbed or flanged portion indicated at 25, which is formed below the surface 26 of the shank 8, providing a substantially semi-circular grooved portion 27, forming the upper edge of the flange 25. The flange 25 is adapted to engage the shoulder 29 formed between the main body of the plunger 21 and the reduced end portion 23, to prevent outward movement of the plunger under the pressure of the spring 22. By proper spacing of this flange the plunger head is so positioned that normally the right hand edge, as viewed in Figure 1, never rises above the surface 26.

The socket 7 is provided with an opening indicated at 30, preferably circular in cross section, which extends radially through the sleeve portion of the socket 7, and opens interiorly thereof normal to one defining surface of the recess 16.

In engaging the coupling, the socket 7 is slipped over the shank 8 toward the collar 6. The upper surface 31 of the recess 16 of the socket is adapted to bear against the spherical surface 24 of the plunger 21 as the end 32 of the plunger moves inwardly over the shank 8. As the corner 33 of the end portion 32 of the socket engages the surface 24, it will depress the plunger inwardly of the recess 21 against the pressure of the spring member 22. Because of the inwardly extending flange 25, the plunger 24 can never rise to a position such that the cylindrical portion 23 thereof will project upwardly above the groove 27 adjacent the outer end of the shank 8. Thus, the square corner 33 will always engage the spherical surface 24 of the plunger, and will therefore have a camming effect upon this surface by which the plunger can be depressed downwardly. As the plunger is depressed, and the spring 22 is compressed, the recess 16 of the socket 7 receives the shank 8, and the end 32 of the socket moves inwardly into a position adjacent the collar 6. When the socket 7 has assumed a position corresponding to that shown in Figure 1, the opening 30 is aligned with the headed end of the plunger 21, and the plunger 21 is forced upwardly into this opening by reason of the spring member 22.

As shown in detail in Figures 1 and 3, the plunger 21, being inclined at an angle with respect to the axis of the opening 30, will wedge itself upwardly into the opening to assume a position such that the rear portion of the plunger, or the left hand portion as viewed in Figure 1, will rise above the lower defining edge of the opening 30, and this defining edge will thus engage the cylindrical lateral surface 23 of the plunger, as shown in Figure 3 by the dotted line indicated by the numeral 35. It will be noted that the engagement of the defining edge of the opening 30 with the cylindrical surface 23 of the plunger extends about a considerable portion of the periphery of the plunger member, and as shown by the angle indicated at 36 subtends an angle approaching 180°.

It is thus apparent that almost half of the inner defining edge of the opening 30 is engaged behind the cylindrical surface 23 of the plunger, and since the inclination of the plunger is less than the angle of friction between the lateral surface of the opening 30 and the plunger surface 23, this provides a locking abutment preventing outward movement of the socket 7 from the shank 8 of the wrench. The remainder of the defining edge of the opening 30 engages across the spherical surface 24 of the plunger member, riding upon this cam surface.

It will thus be seen that a substantial abutment is provided for securing the socket in position, and that removal of the socket cannot be effected except by depression of the plunger member so that the cylindrical surface 23 thereof is forced below the lower defining edge of the opening 30. Also, due to the spring 22 forcing the plunger upwardly, any play, such as that indicated by the space 17, is taken up, since the plunger wedges itself upwardly in the opening 30, and consequently a rigid and positive engagement of the socket 7 with the wrench 5 is provided, and no looseness or any substantial movement of the socket 7 with respect to the wrench 5 can be effected.

To remove the socket 7 from the shank 8, any suitable tool or instrument may be inserted in the opening 30, engaging the surface 24 of the plunger and forcing this surface downwardly so that the upper edge of the cylindrical portion 23 of the plunger is forced below the defining edge of the opening 30, whereby the socket 7 may be moved outwardly of the shank 8 to remove the socket from the wrench.

Thus, the socket 7 may be easily slipped over the shank 8 to secure the socket to the wrench, due to the camming engagement between the edge 33 and the spherical surface 24 of the plunger, but after alignment of the opening 30 with the plunger head has once been obtained, removal of the socket 7 can be effected only by the insertion of a suitable tool into the opening 30. This provides, therefore, a simple coupling means for locking a socket to a wrench, and further, takes up all looseness or play between the socket and the wrench, to provide a tight, positive and rigid engagement therebetween.

Considering now Figure 4, it will be noted that in this figure the opening 30 has been rotated to a position such that it cannot be aligned with the plunger 21. The plunger therefore presses only against an inner surface of the recess 16, and thus provides for only a frictional grip of the socket member 7, whereby the removal of the socket member may be facilitated by merely overcoming the frictional resistance between the shank and the socket. Because of the restriction of outward movement of the plunger 21, so that at no time the forward edge of the spherical surface 24 rises above the surface 26 of the shank, the outer defining edges 33 of the recess 16 do not need to be chamfered, since they will ride over the camming surface 24 and depress the plunger into the position shown in Figure 4 without the necessity of chamfering these edges. This feature thus eliminates the necessity for this chamfering operation.

It is thus apparent that we have provided a simplified coupling engagement, possessing unusual advantages of utility and operation, and which, because of certain inherent characteristics present due to its unique formation, is adapted to provide positive and tight coupling engagement between the socket and shank of a wrench of the type disclosed, with elimination of any play therebetween. Also, we have eliminated the necessity of chamfered edges for the recess which receives the shank of the wrench, and have provided a smooth camming surface for facilitating the insertion of the socket over the shank end of the wrench. It is apparent that a wide variety of sizes and forms of socket 7 may be adapted for use with the particular coupling engagement provided, and that various changes may be made in certain details of construction and design of the present invention, without, however, departing from the underlying basic features disclosed herein.

We therefore do not intend to be limited except as defined by the scope and spirit of the appended claims.

We claim:

A coupling for a wrench shank and socket comprising in combination a shank having a polygonal portion at its free end, said shank having a transverse recess the axis of which is inclined at an angle less than 90° with the part of the axis of the shank which extends toward said free end, a spring in said recess, a plunger disposed and guided in said recess and being normally urged outwardly by said spring, said recess and plunger having interengaging shoulders for retaining the plunger in the recess, the outer end of the plunger having substantially cylindrical side walls and a rounded end wall, said recess, spring and plunger lying in the polygonal portion of the shank near the free end, a socket having a recess adapted to fit over said polygonal portion, the shank and sleeve having stop means to limit the motion of the sleeve relative to the shank, said socket having a radially extending opening adapted to be aligned with the end of the plunger when the stop means is engaged, the diameter of said outer end of the plunger being greater than the diameter of the hole in the socket, and the shoulder and said hole being so related that an edge of the whole may engage the cylindrical side wall of the end of the plunger to hold the socket positively against normal removal, the rounded end of the plunger pressing radially against another edge of said hole to take up any lost motion in fit between the shank and the socket.

SIGMUND MANDL.
EDWARD M. PFAUSER.